(12) United States Patent
Zweighaft et al.

(10) Patent No.: US 6,665,137 B2
(45) Date of Patent: Dec. 16, 2003

(54) METHOD FOR LOCATING DATA TRACKS ON A TAPE MEDIA

(75) Inventors: James Zweighaft, Boulder, CO (US); Clark Milo Janssen, Loveland, CO (US)

(73) Assignee: Quantum Corporation, Milpitas, CA (US)

( * ) Notice: Subject to any disclaimer, the term of this patent is extended or adjusted under 35 U.S.C. 154(b) by 385 days.

(21) Appl. No.: 09/876,705

(22) Filed: Jun. 7, 2001

(65) Prior Publication Data

US 2002/0191324 A1 Dec. 19, 2002

(51) Int. Cl.[7] .............................................. G11B 15/18
(52) U.S. Cl. ..................................................... 360/72.1
(58) Field of Search ............................. 360/72.1, 74.1, 360/72.2, 75, 77.12, 78.01, 78.02

(56) References Cited

U.S. PATENT DOCUMENTS

| | | | | |
|---|---|---|---|---|
| 4,476,503 A | | 10/1984 | Solhjell | |
| 4,975,791 A | * | 12/1990 | Eggebeen | 360/77.01 |
| 5,396,376 A | * | 3/1995 | Chambors et al. | 360/48 |
| 5,583,711 A | * | 12/1996 | Ohkubo et al. | 360/74.5 |
| 5,646,806 A | * | 7/1997 | Griffith et al. | 360/130.22 |
| 5,757,571 A | * | 5/1998 | Basham et al. | 360/72.1 |
| 6,188,532 B1 | * | 2/2001 | Albrecht et al. | 360/63 |
| 6,268,975 B1 | * | 7/2001 | Bickers | 360/72.2 |
| 6,331,920 B1 | * | 12/2001 | Albrecht et al. | 360/63 |
| 6,580,577 B1 | * | 6/2003 | Hanagata | 360/72.3 |

* cited by examiner

*Primary Examiner*—David Hudspeth
*Assistant Examiner*—Fred F. Tzeng
(74) *Attorney, Agent, or Firm*—Patton Boggs LLP

(57) ABSTRACT

According to the present method a plurality of vertically adjacent reference tracks corresponding to a plurality of vertically adjacent data tracks are written to the tape media so that each data track includes a dedicated reference track that is used to locate that data track. To locate a desired data track, the tape head assembly is used to locate a boundary between a reference track corresponding to a desired data track and an adjacent reference track. Using the boundary as a reference point, the tape head assembly is aligned with the desired reference track and the tape media wound through the tape path to read or right data to the corresponding track.

5 Claims, 8 Drawing Sheets

METHOD FOR LOCATING DATA TRACKS ON A TAPE MEDIA

FIELD OF THE INVENTION

The invention relates to tape storage devices, and in particular, to a method for locating a position on a tape media for reading and writing of data in tracks to the tape media.

PROBLEM

In a magnetic tape media storage device, flux transitions representing data are recorded on magnetic tape media in a series of narrow tracks. These tracks are closely spaced on the tape media to maximize the amount of data storage. During the writing process, the tape media is moved past a tape head assembly that writes data tracks of high-density individual flux transitions until the end of the tape media is reached. The tape head assembly is held in a fixed vertical position during each pass to write the data in a horizontal direction relative to the tape media. The area where data is written is refereed to in the art as a "data area." When the end of the tape media is reached, the tape is stopped and restarted in the opposite direction. To avoid delays it is common to write data in the reverse direction in another data area as the tape media is wound in the opposite direction. To write more than one track on the tape media during a single pass, the tape head assembly often includes multiple magnetic gaps, known in the art as write heads. Similarly, to retrieve data from more than one track during a single pass, the tape head assembly often includes multiple reproducing sensors, known in the art as "read heads."

During reading and writing of data to the tape media, the ability to accurately locate a desired track and vertically position the tape head assembly to read or write data to that track is imperative to the proper operation of the storage device. If the position of the tape head assembly is incorrect during a recording operation, new tracks can be partially or completely recorded over existing tracks making reproduction of older data difficult, if not impossible. Similarly, if the position of the tape head assembly is incorrect during a reading operation, the wrong data is retrieved from the tape media.

The tape head assembly is coupled to a step motor that moves the tape head assembly in small fixed increments. Other types of motors capable of moving in fine increments may also be used but regardless of the means employed, all head motions must be made relative to a known reference point. One method of locating a desired track utilizes a known reference point defined by the physical limit of vertical travel of the tape head assembly. From the reference point, a desired data track is located by moving the tape head assembly in fixed increments to the vertical location of the desired track. Unfortunately, this method requires high tolerances in the tape head assembly and the tape guides in the tape path to reproduce the same path of travel each time a new tape cartridge is utilized.

An improved method, taught by U.S. Pat. No. 4,476,503 utilizes the edge of the tape media as the known reference point. According to the method of the '503 patent, the edge of the tape media is automatically located relative to one of the read heads in the tape head assembly. This is accomplished by moving the tape head assembly below the edge of the tape media so that a vertically aligned write head and read head are positioned below the tape edge. As the tape media begins to move during winding, the write head is turned on and the tape head assembly slowly elevated until the read head detects a signal on the tape produced by the write head. This method improved over earlier methods by reducing the distance the tape head assembly moves vertically from the reference point to a desired track. Unfortunately, however, track location errors still occur because of wear on the tape edge or imprecise identification of the tape edge.

A further improvement in track locating methods uses one or more reference tracks written for a short distance at the beginning of the tape media. In one design, two forward reference tracks are used for each forward data gap and two reverse reference tracks are used for each reverse data gap. The reference tracks are written in an otherwise blank section at the beginning of the tape media known as a "calibration area." The calibration area is located at the beginning of the tape media and uses only a small fraction of the tape length. The two forward tracks are written simultaneously by separate write heads as the tape media is moved in the forward direction through the calibration area. The two reverse tracks are similarly written in the opposite direction in the calibration area, but at a different vertical location to avoid interference with the forward reference tracks. Once written on the tape media, the reference tracks are never rewritten unless the entire tape is to erased. If data needs to be appended to a partially filled tape, the reference tracks are first located and used as a starting reference point to reach the next data track of interest.

This design requires a special series of tape and head motions to test for the presence of pre-written reference tracks when a tape is first loaded into a tape storage device. These motions are commonly referred to as "finding the cal tracks". The reference tracks are located by winding the calibration area of the tape media past the tape head assembly as the tape head assembly is moved vertically. For example, to locate a forward reference track, the tape head assembly is moved vertically as the tape media moves horizontally until a forward reference track is crossed. The area above and below the reference track is blank to permit the tape head assembly to detect the signal from the reference track. Read circuitry connected to the read heads, combined with a microprocessor, detects the reference signal amplitude and remembers the vertical head position at which it occurred. Once located, the position of the reference track is used to find all forward tracks. If no reference tracks are found, the tape is considered blank and the drive will write a new set of reference tracks for use in all subsequent write and read operations. Once the reference tracks are located or written, all forward data tracks are written at fixed vertical offsets relative to the forward reference tracks. All reverse data tracks are likewise written at fixed vertical offsets relative to the reverse reference tracks.

This method eliminates the problem of tape edge wear and reduces the distance the tape head assembly must move vertically from the measured reference track locations to the next track of interest. Unfortunately, however, between passes, the tape head assembly must be moved vertically from the known reference track location to the next data track location. This requires a known track pitch and step size. Due to errors in these quantities, the position of the tape head assembly is often imperfect. In addition, it is well known to those skilled in the art that tape media can shrink and expand with tension, age, temperature and humidity. Exact knowledge of the vertical location of a reference track therefore does not confer exact knowledge of the vertical location of a data track, which can be many track widths away.

SOLUTION

The present method for locating individual data tracks on a tape media overcomes the problems outlined above and advances the art by increasing the number of reference tracks from one or two per data area to one per data track. According to the method of the present invention, a plurality of vertically adjacent reference tracks corresponding to a plurality of vertically adjacent data tracks are written to the tape media so that each data track includes a dedicated reference track that is used to locate that data track. To locate a desired data track, the tape head assembly is used to locate a boundary between a reference track corresponding to a desired data track and an adjacent reference track. Using the boundary as a reference point, the tape head assembly is aligned with the desired reference track and the tape media wound through the tape path to read or right data to the corresponding track.

A first advantage of the present method is that each data track includes a corresponding reference track so that the exact vertical location of each data track is known by reference to a corresponding reference track. A second advantage of the present invention is that step size errors resulting from vertical movement of the tape head assembly from the location of a reference track to the location of a desired data track are eliminated.

DETAILED DESCRIPTION

The invention summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 1:
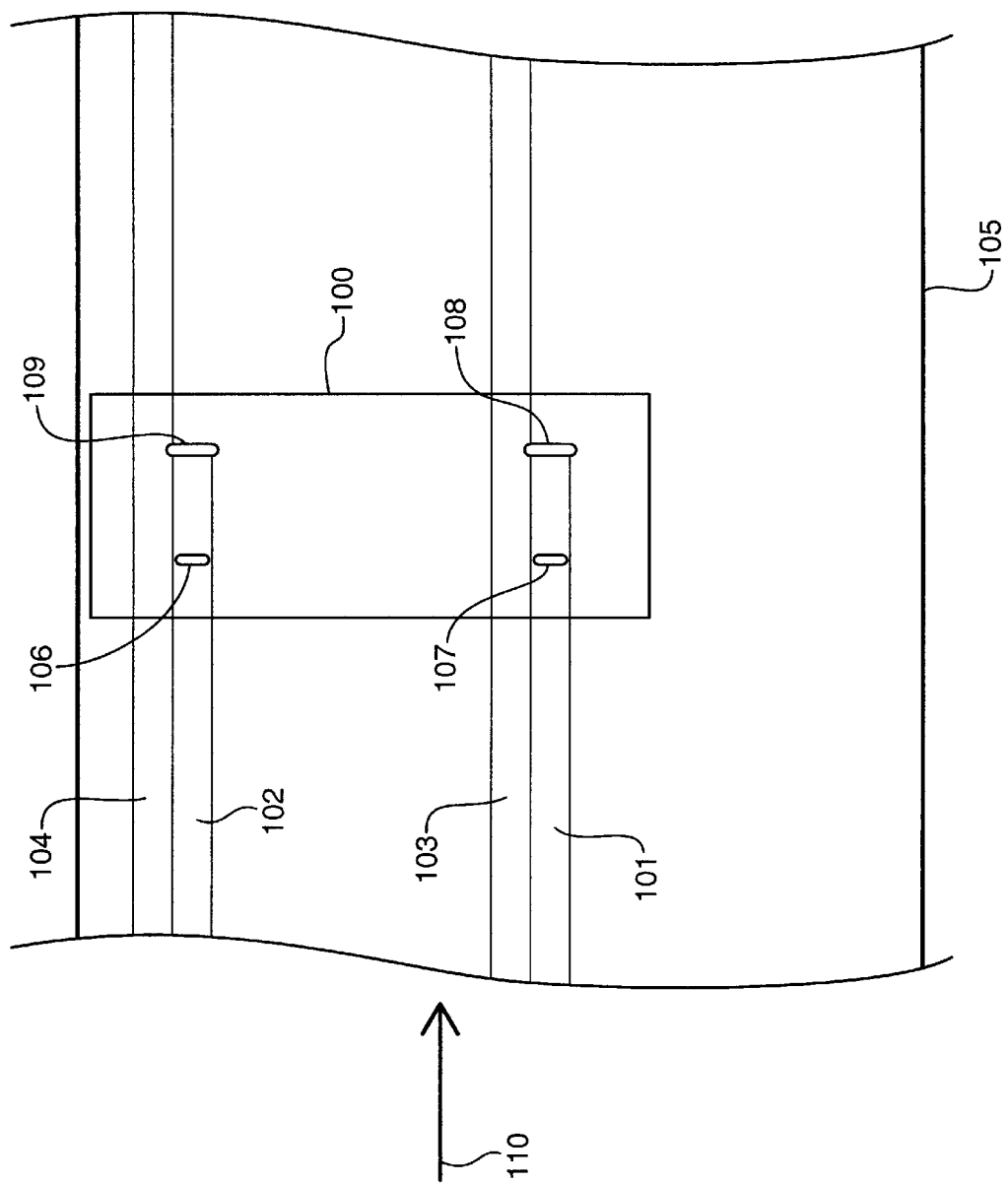
FIG. 1 illustrates a multi-gap tape head assembly writing data tracks to a tape media in an example of the prior art.
Figure 2:
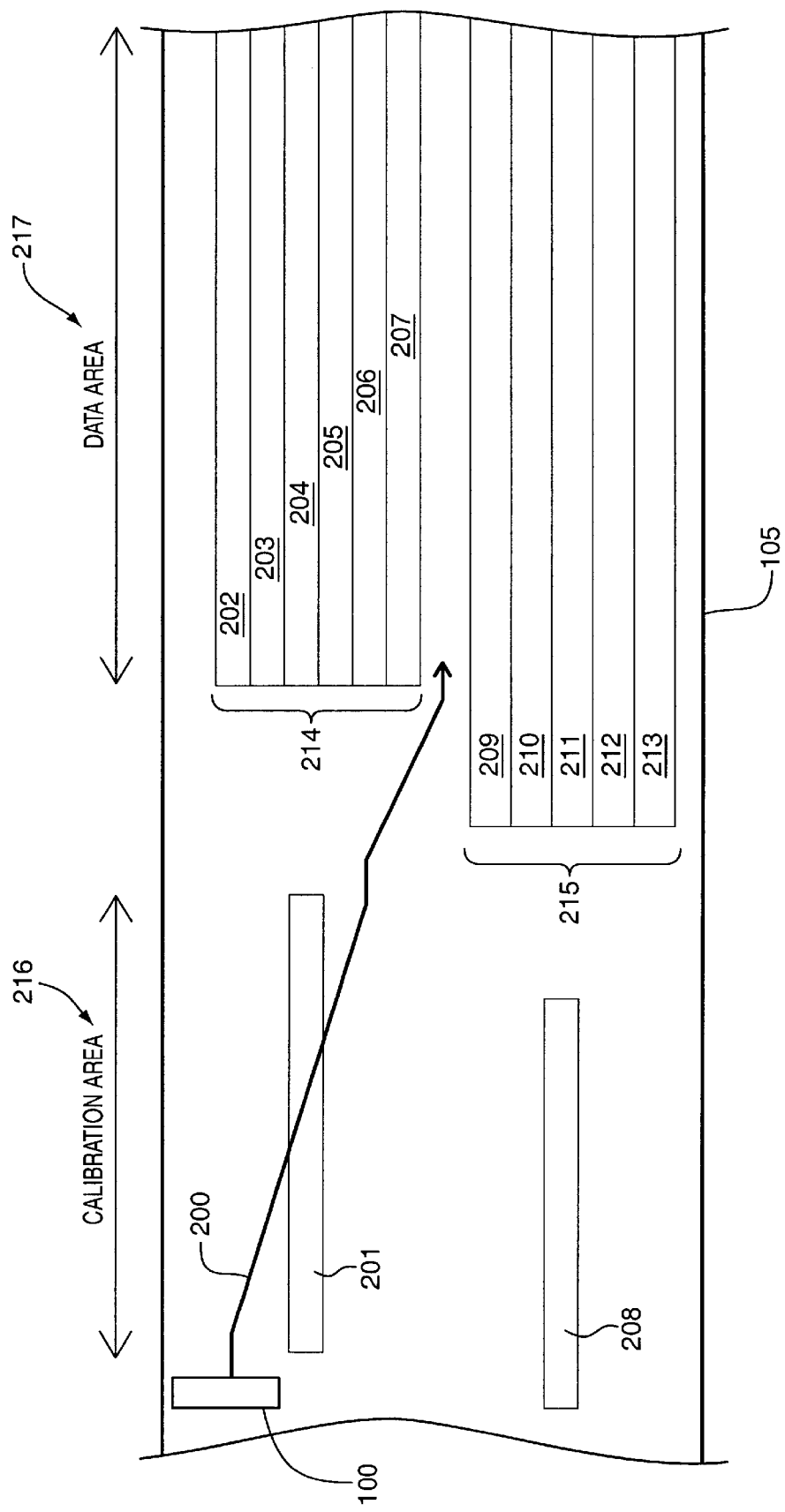
FIG. 2 illustrates an example of a prior art method of locating data tracks using reference tracks.

Background FIGS. 1–2:

FIG. 1 illustrates a multi-gap tape head assembly 100 writing two data tracks 101 and 102. Tracks 101 and 102 are not adjacent to each other, but are being simultaneously written directly adjacent to previously written tracks 103 and 104. The write head 109 imparts flux transitions on the tape media 105, to form track 102. Read head 106 is inline with write head 109 to immediately check the data as it is written to the tape media 105. Similarly, write head 108 imparts flux transitions to tape media 105 to form track 101, which is checked by read head 107. Tape media 105 is shown transparently to reveal write heads 106 and 107 and read heads 108 and 109. Tape head assembly 100 maintains contact with the tape media 105 as the tape media 105 is moved in the direction shown by arrow 110.

As illustrated in FIG. 1, tape media 105 contains two tracks 103 and 104 written on a previous pass at which time the tape head assembly 100 was positioned higher by one track width. Tape head assembly 100 is repositioned vertically after each pass so that write heads 108 and 109 are aligned just below and adjacent to any previously written tracks, e.g. 103 and 104. At the end of a pass, the tape head assembly 100 is repositioned and the tape media 105 is again wound to form adjacent tracks, e.g. 101 and 102. Using this method a large number of tracks are recorded two at a time to eventually cover the surface of the tape media 105. Those skilled in the art will appreciate that certain details, such as deliberate partial overwrite, operation in the reverse direction and other issues have been omitted for the sake of clarity.

FIG. 2 illustrates a prior art method of locating a desired data track or write position on the tape media 105. On FIG. 2, tape media 105 includes a calibration area 216 that includes calibration tracks 201 and 208 and a data area 217 that includes data tracks 202–207 and 209–213. In the data area 217, the data tracks are organized in data bands, 214 and 215, that each include a plurality of data tracks, namely data tracks 202–207 and 209–213 respectively. Each data band, e.g. 214, on the tape media 105 includes its own corresponding reference track, e.g. 201, used to locate the data tracks, 202–207 located in the that data band 214. The reference tracks, 201 and 208, are written to the tape media 105 when a blank tape cartridge is presented to the tape storage device, before any data tracks are written.

Once written, the reference tracks, 201 and 208, are used to locate the respective data tracks 202–207 and 209–213. Thus, reference track 201 is used to locate the data tracks 202–207 located in corresponding data band 214 and the reference track 208 is used to locate the data tracks 209–213 located in the corresponding data band 215. For example, to locate the next adjacent data track in the data band 214 for a write operation the tape media 105 is moved horizontally while the tape head assembly 100 is moved along trajectory 200 so that it crosses over the reference track 201. The area above and below the reference track 201 is blank so that the signal detected by the tape head assembly 100 increases from a low noise level to a higher signal level when the tape head assembly 100 is positioned over the reference track 201. The change in signal level determines the location of the reference track 201, which is then used to locate the next adjacent data track for the write operation. It should be noted that the reference track detection is performed only once when a tape cartridge is first loaded into a tape storage device. Once the location of a reference track, e.g. 201 is determined and stored in a memory component of the storage device, the tape head assembly 100 is positioned to read from the existing tracks 202–207 or positioned adjacent the last written track 207 to write a new data track. Any number of data tracks can be written based on the location to the next track of interest. Unfortunately, the distance from the location of the reference track 201 and the next data track of interest may be many times the width of single track resulting in the introduction of cumulative errors in track location.

Figure 3:
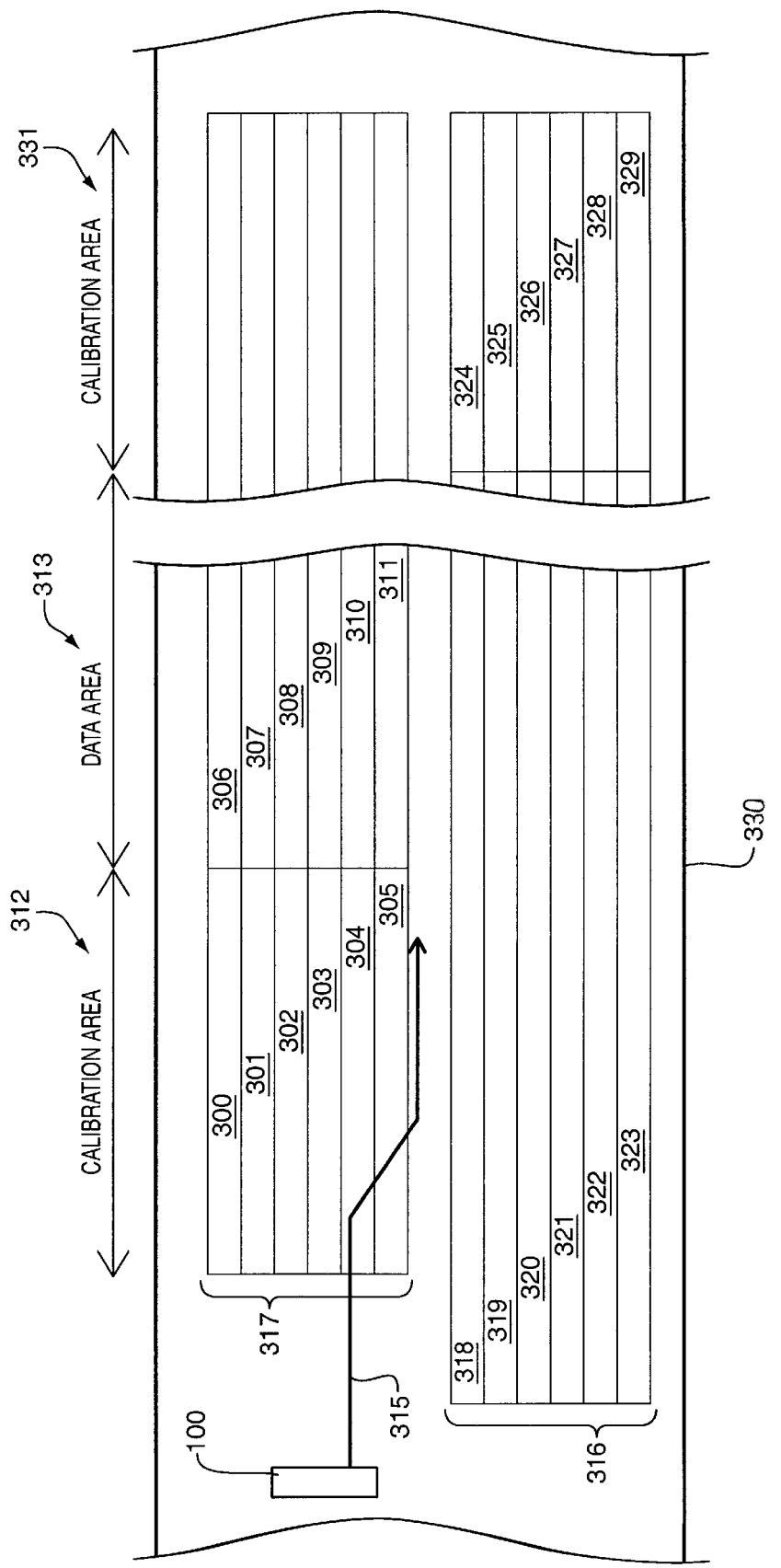
FIG. 3 illustrates a partially written tape media in according to the method of the present invention.

Present Method FIG. 3:

According to the method of the present invention, the number of reference tracks written is increased from one per data band, e.g. 214, to one per data track. Advantageously, no blank space is left between reference tracks so that each data track includes a horizontally adjacent corresponding reference track used in the location of that data track. Also advantageously, the present method eliminates step size errors resulting from the vertical movement of the tape head assembly 100 from the location of a reference track to the location of the next track of interest.

FIG. 3 illustrates a partially written tape media 330 in an example of the method according to the present invention. On FIG. 3, the tape media 330 includes two data bands 317 and 316 used to illustrate the principles of the present invention. Those skilled in the art will appreciate that the tape media 330 would include additional data bands although only data bands 316 and 317 are shown on FIG. 3 for clarity. The data band 317 includes six reference tracks 300–305, written in the calibration area 312, and six data tracks 306–311 written in the data area 313 and horizontally aligned with the reference tracks 300–305. The data band 316 includes six data tracks 318323. The six data tracks 318–323 include each include a corresponding horizontally aligned reference track 324–329 written in a calibration area 331 located at the opposing end of the tape media 330.

With the reference tracks 300–305 and 324–329 located adjacent to one another, without a blank area between the tracks, it is not possible to detect their location by the means employed in the prior art. Because the flux transitions in adjacent tracks, e.g. 300 and 301, align randomly due to errors in tape speed, tension, and other factors, the reproduced signal does not change amplitude in a predictable manner as the tape head assembly 100 moves from one reference track 300 to an adjacent reference track 301.

In the present method, two frequencies (f1) and (f2), are alternatively used to record reference tracks 300–305 and 324–329. Thus, every other reference track, e.g. 300, 302, 304 etc. is recorded in the first frequency (f1) and the remaining reference tracks e.g. 301, 303, and 305 are recorded in the second frequency (f2). Alternatively, the reference tracks 300–305 could be recorded using different data patterns to differentiate the individual tracks 300–305 to the tape head assembly 100. Those skilled in the art will appreciate that any one of numerous methods could be used to distinguish the reference tracks 300–305 and that it is not the method, but rather, the fact of the distinction that is important. The above-described methods apply equally to the writing of the reference tracks 324–329.

Figure 4:
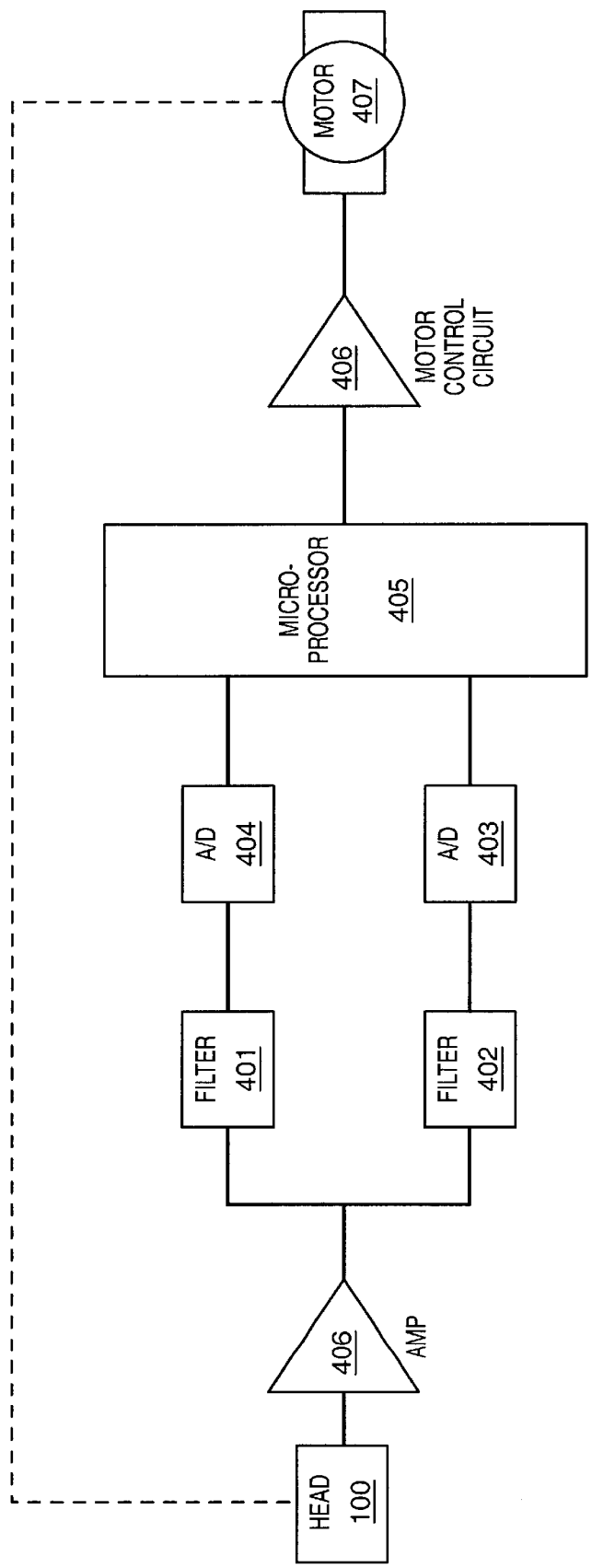
FIG. 4 illustrates a tape drive architecture in an example of the present invention.

Tape Storage Device Architecture FIG. 4:

FIG. 4 illustrates a tape drive architecture according to the present invention. FIG. 4 depicts the tape head assembly 100, an amplifier 400, a pair of filters 401 and 402, a pair of analog-to-digital converters, 404 and 403, a microprocessor 405 a motor control circuit 406 and a motor 407. The output of the tape head assembly 100 is connected to amplifier 400. The output from amplifier 400 is connected in parallel to the filters, 401 and 402, which are tuned to frequencies, f1 and f2. Filter 402 is connected to analog-to-digital converter 403 and filter 404 is connected to analog-to-digital converter 404. The outputs of the analog-to-digital converters, 403 and 404, are proportional to the amplitude of frequencies f1 and f2 and are connected to the microprocessor 405. The microprocessor 405 is connected to motor control circuit 406. The motor control circuit 406 controls the operation of motor 407, which in turn moves tape head assembly 100 though a conventional mechanical linkage.

Referring to FIGS. 3 and 4, to locate a data track, the tape head assembly 100 first locates the boundary between the reference track corresponding to the desired data track and an adjacent reference track. Once the boundary location is determined, the tape head assembly continues stepping a short distance to position one of the read head or write head for a desired read or write operation. In one example of the present method using a conventional DLT tape cartridge, the distance from the boundary position to an adjacent track is only 1.5 track widths in the case of a write operation. In the case of a read operation, the distance from the boundary position to the center of an adjacent track is only 0.5 track widths. Advantageously, the shorter distance of travel for the tape head assembly 100 greatly reduces the accumulation of errors in moving the tape head assembly 100 from a reference track to a desired data track.

For example, to locate an empty data track adjacent the data track 311 for a write operation, the tape media 317 is moved horizontally while the tape head assembly 100 is moved along trajectory 315 so that it crosses over the reference track 304. When a read head, or a write head operated in read mode, of the tape head assembly 100, is centered over the reference track 304, written at frequency (f1), it will reproduce only that signal. As the tape head assembly 100 moves through trajectory 315 it will for a time be aligned substantially over the reference track 304 and pick up frequency f1 predominately. As the head assembly 100 moves lower, it crosses over the boundary between reference tracks, 304 and 305, and the output of the head assembly 100 contains a combination of frequencies, f1 and f2. When the amplitudes are substantially equal identifying the boundary between reference tracks, 304 and 305, the vertical position of the tape head assembly 100 is saved. Once the boundary between reference tracks, 304 and 305, is saved, microprocessor 405 moves the tape head assembly 100 a short distance to position the tape head assembly 100 for the write operation.

Figure 5:
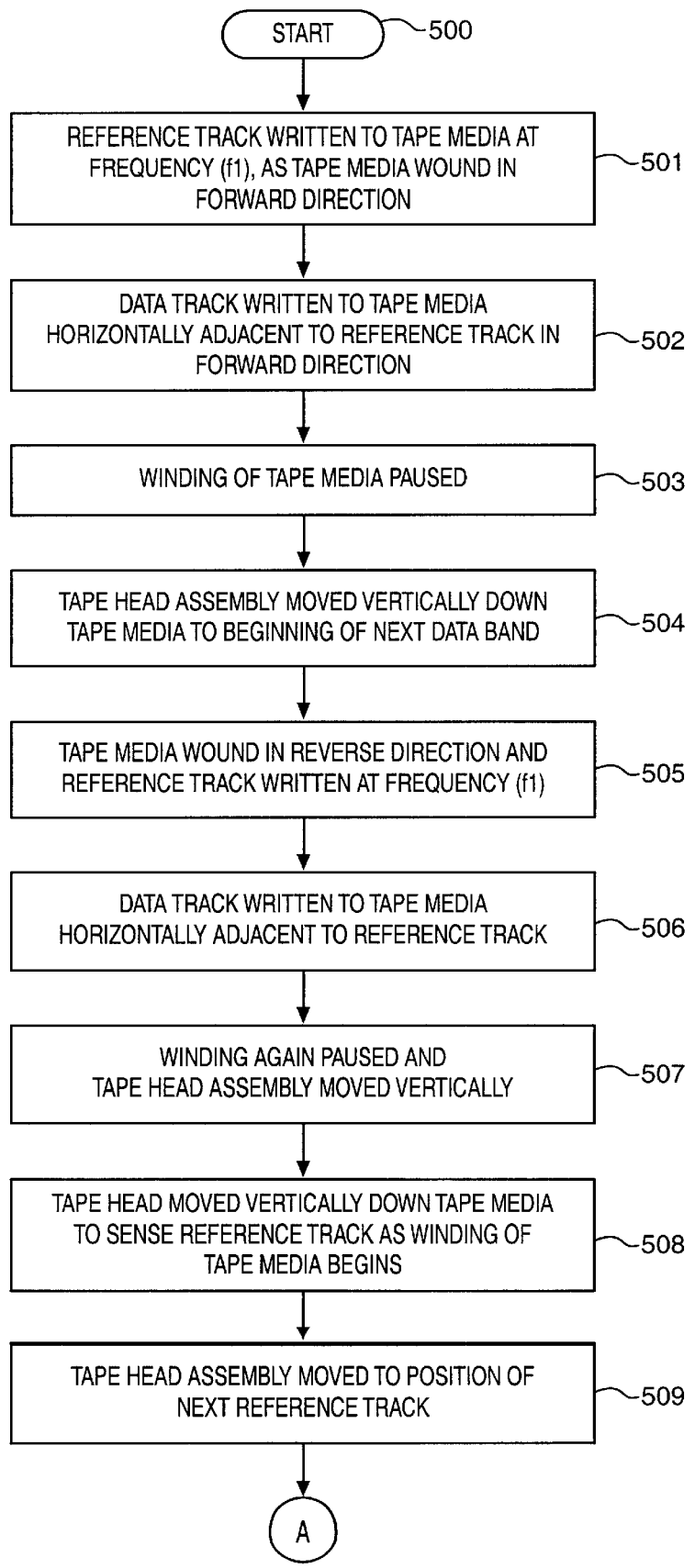
FIGS. 5–7 are a flow chart illustrating the operational steps according to the method of the present invention.
Figure 6:
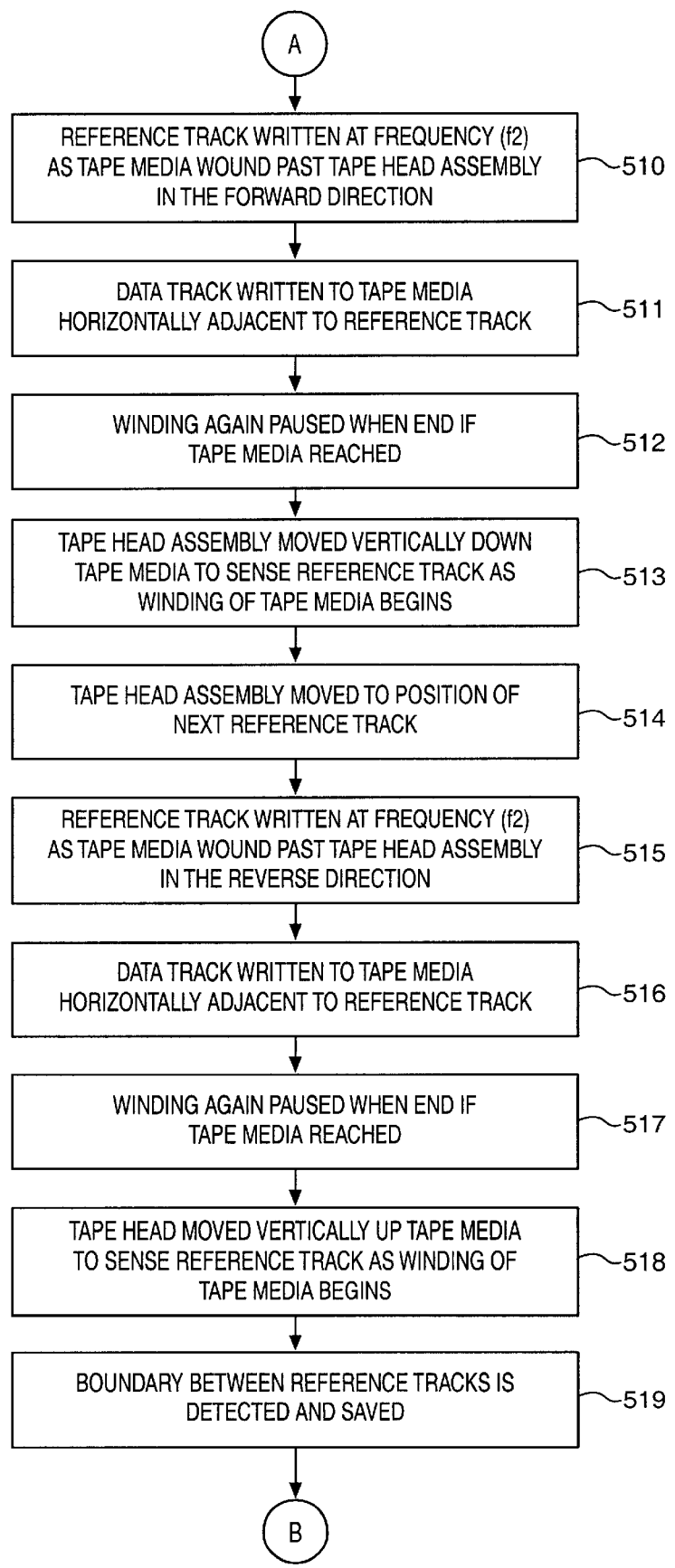
Figure 7:
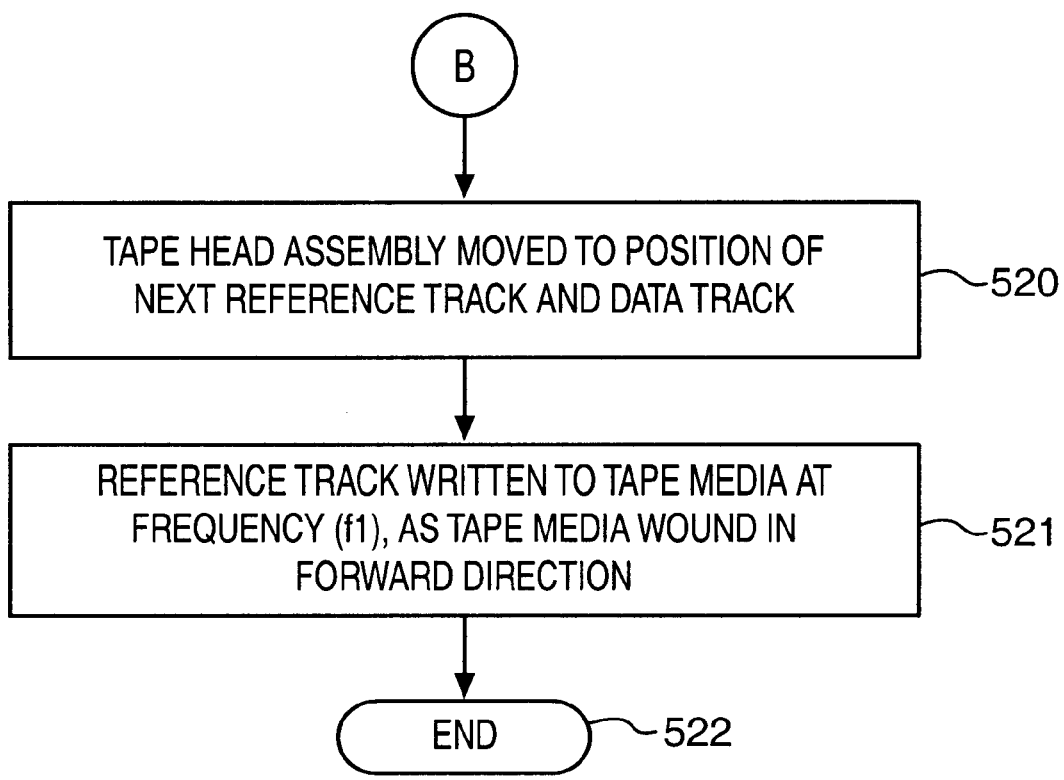
Figure 8:
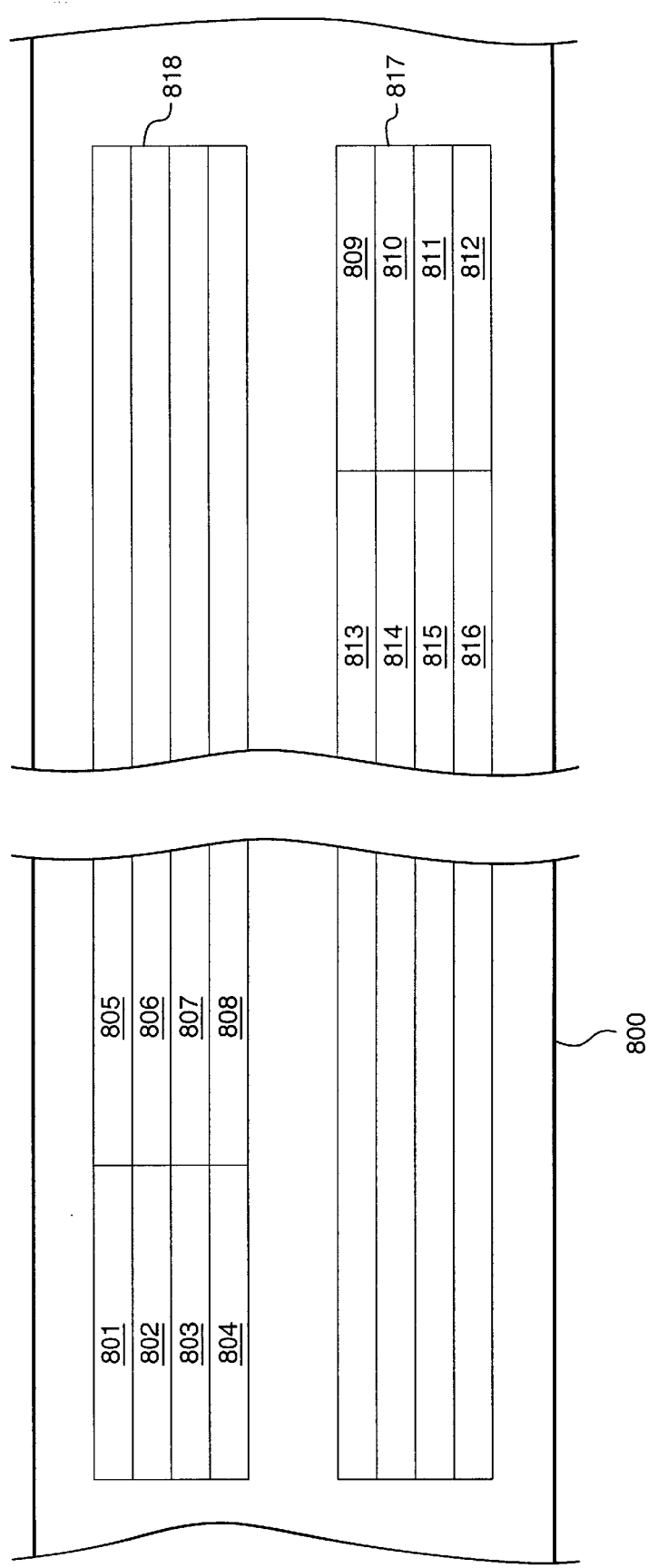
FIG. 8 illustrates another example of a partially written tap media according to the method of the present invention.

Examples of Various Operations FIGS. 5–8:

FIGS. 5–7 are a flow chart illustrating an example of the present method to produce the reference tracks and data tracks of FIG. 8. FIG. 8 depicts a tape media 800 that includes two data bands 817 and 818. Data band 818 includes data tracks 805–808 written to the tape media 800 as the tape media 800 is wound in the forward direction. Data band 817 includes data tracks 813–816 written to the tape media 800 as the tape media 800 is wound in the reverse direction. For purpose of illustration, the tape head assembly in this example (not shown on FIG. 8) includes a single read head and write head. Those skilled in the art, however, will appreciate that the method of the present invention is substantially the same for tape head assemblies that include multiple read heads and multiple write heads.

On FIG. 5, the operation begins at step 500 with a tape cartridge loaded into the tape storage device. At step 501, a reference track 801 is written to the tape media 800 at the frequency (f1), as the tape media 800 is wound past the tape head assembly 100 in the forward direction. At step 502, a data track 805 is written to the tape media 800 immediately following and horizontally adjacent to the reference track 801. It should be noted that the winding motion of the tape media 800 continues without pausing as the tape head assembly 100 switches from writing reference tones to the reference track 801 and writing data to the data track 805. At step 503, winding is paused when the end of the tape media 800 is reached. At step 504, the tape head assembly is moved vertically down the tape media 800 to the beginning of the next data band 817. At step 505, the tape media is wound in the reverse direction and reference track 809 is written to the tape media 105 at frequency (f1). At step 506, a data track 813 is written to the tape media 800 immediately following and horizontally adjacent to the reference track 809. When the end of the tape media 800 is reached, winding is again paused and the tape head assembly 100 is moved vertically to the reference track 801 in the data band 818, at step 507. At step 508, the tape head assembly 100 is moved vertically down the tape media 800 as winding of the tape media 800 begins to sense the reference track 801. When the tape head assembly 100, is centered over the reference track 801 it reproduces only the first frequency (f1). Since at this point in the example, reference track 802 is not yet written, the tape head assembly 100 is moved to the position of the next reference track 802 from its current position over reference track 801, at step 509. At step 510, reference track 802 is written to the tape media 800 at the frequency (f2) as the tape media 800 is wound past the tape head assembly in the forward direction. At step 511, data track 806 is written to the tape media 800 immediately following and horizontally adjacent to the reference track 802.

At step 512, winding is again paused when the end of the tape media 800 is reached. At step 513, the tape head assembly 100 is moved vertically down the tape media 800 to sense the reference track 809 as winding of the tape media 800 begins again. When the tape head assembly 100, is centered over the reference track 809 it reproduces only the first frequency (f1). Since at this point in the example, reference track 810 is not yet written, the tape head assembly 100 is moved to the position of the next reference track 810 from its current position over reference track 809, at step 514. At step 515, reference track 810 is written to the tape media 800 at the frequency (f2) as the tape media 800 is wound in the reverse direction. At step 516, data track 814 is written to the tape media 800 immediately following and horizontally adjacent to the reference track 810.

At step 517, winding is again paused when the end of the tape media 800 is reached. At step 518, the tape head assembly 100 is moved vertically up the tape media 800 to sense for the reference track 801 as winding of the tape media 800 begins again. When the tape head assembly 100, is centered over the reference track 801 it reproduces the frequency (f1). As the tape head assembly moves lower, it crosses over the boundary of the reference tracks 801 and 802 and the output of the tape head assembly 100 contains a combination of frequency f1 and frequency f2. When the boundary between reference tracks 801 and 802 is detected, microprocessor 405 saves the vertical position of the tape head assembly 100, at step 519. Responsive to saving the boundary position, the tape head assembly 100 is moved to the position of the next reference track 803 and data track 807, at step 520. At step 521, reference track 803 is written to the tape media 800 at the frequency (f1) as the tape media 800 is wound past the tape head assembly in the forward direction. At step 521, data track 807 is written to the tape media 800 immediately following and horizontally adjacent to the reference track 803. The above sequence of writing data tracks and reference tracks in the forward and reverse direction is repeated until all desired data is written to the tape media 800 and the operation ends at step 522.

The above-described microprocessor can be comprised of instructions that are stored on storage media. The instructions can be retrieved and executed by the microprocessor. Some examples of instructions are software, program code, and firmware. Some examples of storage media are memory devices, tape, disks, integrated circuits, and servers. The instructions are operational when executed by the microprocessor to direct the microprocessor to operate in accord with the invention. The term "microprocessor" refers to a single processing device or a group of inter-operational processing devices. Some examples of microprocessors are integrated circuits and logic circuitry. Those skilled in the art are familiar with instructions, microprocessors, and storage media. Those skilled in the art will also appreciate variations of the above-described embodiments that fall within the scope of the invention. As a result, the invention is not limited to the specific examples and illustrations discussed above, but only by the following claims and their equivalents.

What is claimed is:

1. A method of locating a position of a desired data track on a tape media, comprising the steps of:

writing a plurality of vertically adjacent reference tracks and a plurality of data tracks horizontally adjacent to the plurality of vertically adjacent reference tracks;

winding the tape media past a tape head assembly;

responsive to winding the tape media, locating a boundary between an individual reference track and an adjacent individual reference track; and using the boundary between the individual reference track and the adjacent individual reference track to locate the position of the desired data track.

2. The method of claim 1 wherein the step of writing the plurality of reference tracks and data tracks comprises:

writing a first reference track as the tape media is wound in a first direction;

writing a first data track immediately following the first reference track as the tape media is wound in the first direction;

moving the tape head assembly to a new vertical position;

writing a second reference track as the tape media is wound in a second direction;

writing a second data track immediately following the second reference track as the tape media is wound in the second direction;

moving the tape head assembly to a vertical position adjacent the first reference track;

writing a third reference track vertically adjacent the first reference track as the tape media is wound in the first direction;

writing a third data track immediately following the third reference track as the tape media is wound in the first direction;

moving the tape head assembly to a vertical position adjacent the second reference track;

writing a fourth reference track vertically adjacent the second reference track as the tape media is wound in the second direction; and writing a fourth data track immediately following the fourth reference track as the tape media is wound in the second direction.

3. The method of claim 2 the further comprising the steps of:

writing the first reference track and the second reference track in a first frequency; and writing the third reference track and the fourth reference track in a second frequency.

4. The method of claim 3 wherein the step of locating the boundary between the individual reference track and the adjacent individual reference track comprises:

sensing one of the first frequency and the second frequency as the tape head assembly aligns with one of the first, second, third, and fourth reference tracks;

moving the tape head assembly vertically as the tape media is wound;

sensing a combination of the first frequency and the second frequency as the tape head assembly crosses the boundary between one of the first, second, third, and fourth reference tracks.

5. The method of claim 4 wherein the step of using the boundary between the individual reference track and the adjacent individual reference track to locate the position of the desired data track comprises:

responsive to sensing the combination of the first frequency and the second frequency, storing the position of the tape head assembly; and moving the tape head assembly vertically a predetermined amount to align with the position of the desired data track.

* * * * *